A. P. Hopkins.
Grading Plow.

№ 86,229. Patented Jan. 26, 1869.

Witnesses:
Jos. Becker.
Wm. A. Morgan

Inventor:
A. P. Hopkins
pr. Munn & Co
Attorneys.

A. P. HOPKINS, OF BENTLEYVILLE, PENNSYLVANIA.

Letters Patent No. 86,229, dated January 26, 1869.

IMPROVEMENT IN GRADING-PLOW AND SCRAPER.

The Schedule referred to in these Letters Patent and making part of the same.

*To all whom it may concern:*

Be it known that I, A. P. HOPKINS, of Bentleyville, in the county of Washington, and State of Pennsylvania, have invented a new and improved Grading-Plow, or Scraper; and I do hereby declare that the following is a full, clear, and exact description thereof, which will enable others skilled in the art to make and use the same, reference being had to the accompanying drawings, forming a part of this specification, in which—

Similar letters of reference indicate corresponding parts.

My invention has for its object to furnish an improved machine for moving dirt, snow, and other substances, from place to place, as in grading roads, &c., clearing off snow or dirt from roads, pavements, yards, &c., and for similar uses; and It consists in the construction and combination of the various parts of the machine, as hereinafter more fully described.

Figure 1:
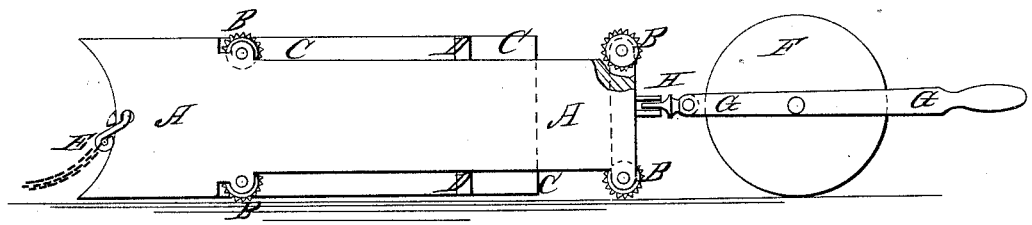
Figure 1 is a side view of my improved plow or scraper, part being broken away, to show the construction.

A is the landside of the plow, or scraper, the forward end of which is concaved, as shown in fig. 1, so that it may have a point at both its upper and lower edge, enabling it to be used either side up, or as a left-hand or right-hand scraper, as may be desired.

Figure 2:
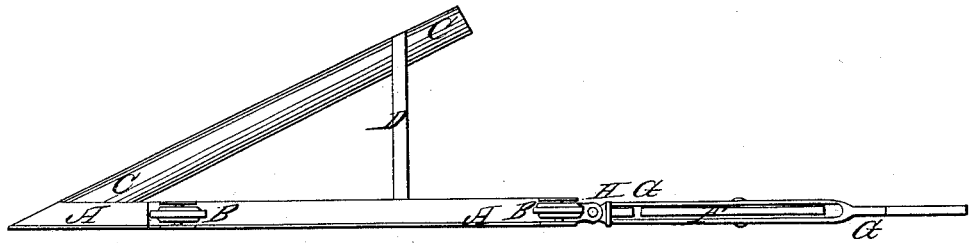
Figure 2 is a top view of the same.

The rear parts of both edges of the landside A are cut away, as shown in fig. 1; and to the forward and rear parts of both of said edges are pivoted wheels, B, having teeth or spurs formed upon them, as shown in figs. 1 and 2, which, as the machine is drawn forward, take hold of the ground, and compel the scraper to move forward in a straight line, or, in other words, with its landside in line with the draught.

C is the mould-board or inclined side of the scraper, the forward end of which is so formed as to correspond with the forward end of the landside A.

The outer side of the mould-board is concaved or hollowed out longitudinally, as shown in the drawings, so that it may work equally well when the machine is used with either side up.

The rear part of the mould-board C is strengthened, and enabled to resist the side pressure, by a brace or braces, D, interposed between the rear end of the said mould-board C and the rear end of the landside A, as shown in figs. 1 and 2.

E is the draught-chain, which is attached to the middle part of the forward end of the machine, as shown in fig. 1, so that it may be in proper working-position, whatever side of the machine may be up.

F is a wheel, the diameter of which equals the height of the machine, and which is pivoted in the slot of the slotted lever G.

The forward end of the lever G is connected with the middle part of the rear end of the landside A by a double-jointed connection, H, so that the said lever and wheel may have a free lateral and vertical movement.

The rear end of the lever G extends back, so as to serve as a handle.

The lever G and wheel F enable the landside to be raised, to free the machine, should it become fast when in use.

The said lever and wheel also serve to turn and guide the machine.

It should also be observed that the machine should be made sufficiently heavy to cause the teeth or spurs of the wheels B to take a firm hold upon the ground, so as to keep the landside A in line with the draught.

I claim as new, and desire to secure by Letters Patent—

1. Constructing the scraper A C D so that it may be used either side up with equal facility, substantially as herein shown and described.

2. The combination of the toothed or spur-wheels B with the landside A of the scraper, substantially as herein shown and described, and for the purpose set forth.

3. The slotted lever G and wheel F, in combination with the rear end of the landside A, substantially as herein shown and described, and for the purpose set forth.

A. P. HOPKINS.

Witnesses:
J. W. STEPHENS,
WILLISON KERR.